3,123,715
PHOTORESPONSIVE CIRCUIT FOR BOTTLE INSPECTION
Robert G. Husome, Manhattan Beach, Calif., assignor, by mesne assignments, to Barry-Wehmiller Machinery Co.
Filed Apr. 18, 1961, Ser. No. 103,757
9 Claims. (Cl. 250—214)

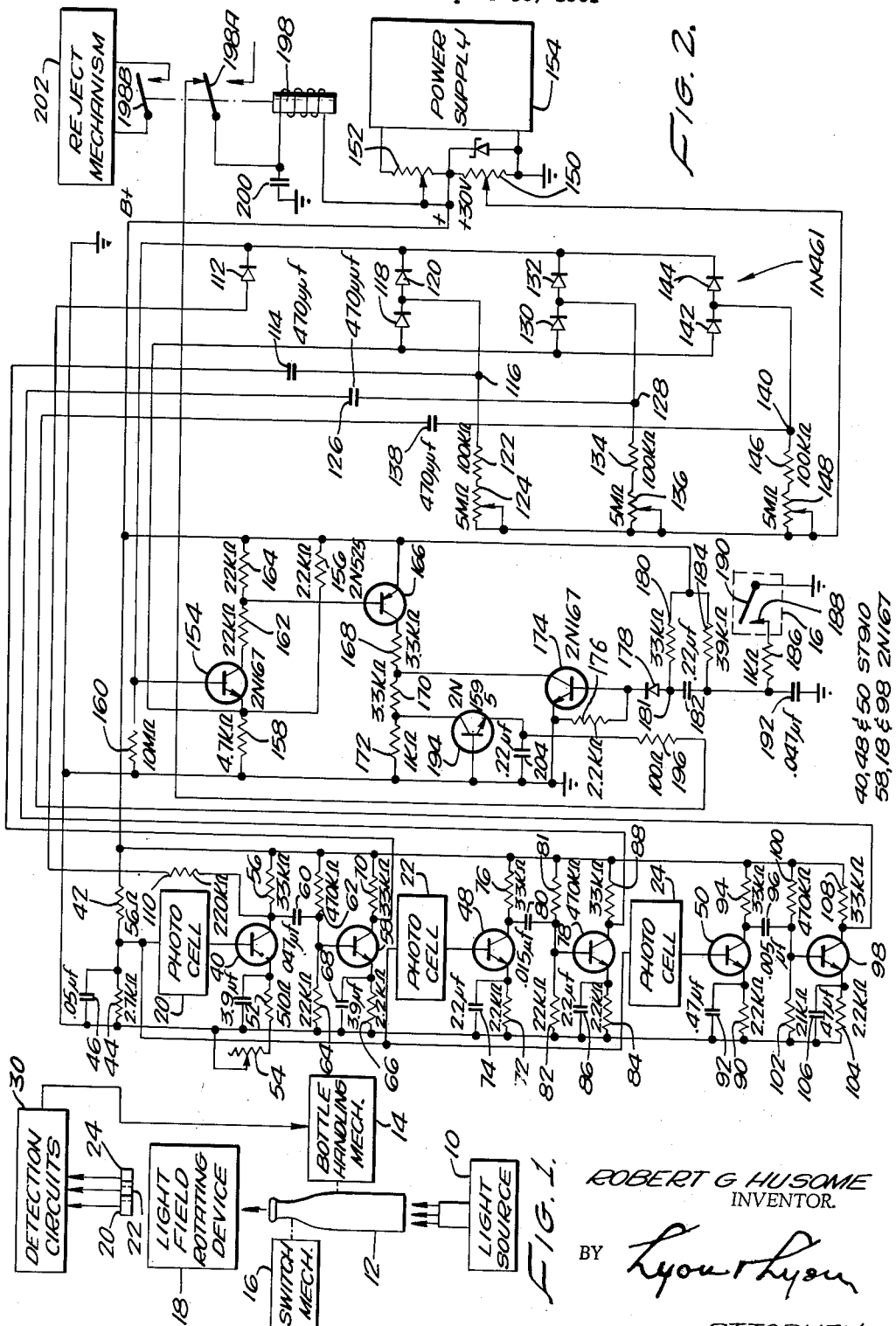
March 3, 1964     R. G. HUSOME     3,123,715
PHOTORESPONSIVE CIRCUIT FOR BOTTLE INSPECTION
Filed April 18, 1961
ROBERT G HUSOME
INVENTOR.
BY Lyon & Lyon
ATTORNEYS United States Patent Office 3,123,715
Patented Mar. 3, 1964

This invention relates to apparatus for inspecting empty bottles for cleanliness and, more particularly, to improvements in the electrical circuits employed therewith.

A presently preferred arrangement for inspecting empty bottles for cleanliness usually has what can be termed an inspection zone through which these bottles are passed. At one side of the inspection zone is a source of illumination and on the other side is some type of photoelectric or photocell device which can respond to a decrease in the level of illumination which occurs due to the presence of dirt particles in a bottle. The output of the photocell device is usually applied to an amplifier and then to a detector which operates a reject mechanism. For detecting smaller particles of dirt which provide small light-level changes, it is necessary to increase the gain of the amplification system to which the output from the photoelectric-detection arrangement is applied. However, because of such variable factors as differences in bottle color, lettering on bottles, differences in glass thickness in the bottles, etc., if the gain of the amplification system which follows the photocells is set too high, false triggering of the reject mechanism occurs, with consequent rejection of clean bottles. Accordingly, photoelectric inspection systems of this general type are operated with a gain level for the amplification system set at a value where false triggering will not occur. A necessary concomitant of this type of operation is that dirt particles below a certain size cannot trigger the inspection apparatus reject mechanism, and, accordingly, bottles containing dirt particles below this size are passed as being clean.

An object of this invention is the provision of an inspection circuit for apparatus of the general type indicated which enables detection of dirt particles of a smaller size than has been possible heretofore.

Another object of this invention is the provision of an inspection system which is not triggered falsely by characteristics of the glass of bottles being inspected.

Still another object of the present invention is the provision of a novel circuit arrangement which is responsive to abrupt changes in light conditions, rather than to gradual changes.

These and other objects of the invention may be achieved in an arrangement wherein more than one photocell is employed for determining whether there is any dirt in an empty bottle being inspected. The output from these various photocells is separately amplified, and each of them is applied to a separate network which responds only to the amplified signals which include an abrupt rate of change, rather than a gradual rate of change or difference in signal level. Any outputs from these networks are combined, and, if they exceed a predetermined amplitude, are employed to trigger a reject mechanism. It should be noted that abrupt changes in the signal detected by the photocells are caused by the presence of dirt particles, whereas gradual changes are substantially always caused by conditions of the glass of which bottles are made.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a schematic diagram of a typical arrangement for inspecting empty bottles; and
FIGURE 2 is a circuit diagram of an embodiment of the invention.

Reference is now made to FIGURE 1, which exemplifies a type of photoelectric inspection system for empty bottles, in which system the circuit, which is an embodiment of this invention, may be employed. This includes a light source 10 for the purpose of illuminating a bottle 12. The bottle is conveyed through the inspection zone and to a reject area, if necessary, by mechanism represented by the rectangle 14, which is labeled "bottle-handling mechanism." Such apparatus is known and exemplified, for example, in Patent No. 2,800,266. The bottle-handling mechanism holds the bottle 12 in position to be inspected. A switch mechanism 16 is actuated each time the bottle 12 is properly positioned in the inspection zone.

Above the bottle is an arrangement represented by the rectangle 18, which is entitled "light-field-rotating device." This may comprise a set of lenses and prisms for receiving the light field representing the image of the bottle 12, and for focusing this light field upon a plurality of photoelectric cells 20, 22, 24, as well as for rotating the light-field image whereby these photoelectric cells are enabled to scan every portion of the light field. An arrangement for providing these operations may be found described and claimed in an application for a Bottle-Cleanliness Inspection Apparatus, by James H. Wyman, filed April 11, 1960, bearing Serial No. 21,164, and which is assigned to a common assignee.

The outputs from three photocells are applied to circuitry identified as detection circuits 30. These detection circuits interpret the information conveyed by the photocells 20, 22, 24, and upon detection of signals indicative of dirt particles in the bottle 12, may provide an output for instructing the bottle-handling mechanism 14 to transfer the bottle 12 to a reject area, rather than back to the production line. The detection circuits 30 in accordance with this invention are shown in FIGURE 2.

Reference is now made to the circuit diagram of the embodiment of the invention which is shown in FIGURE 2. The three photocells 20, 22, 24 preferably comprise photovoltaic crystals or wafers. These are positioned so that the photocell 20 substantially covers the area within the central region of the light field, the photocell 22 covers an adjacent ring-shaped area of the light field, and the photocell 24 covers the remainder of the light field, which also is ring shaped. The light field received by the light-field rotating device from the bottle is stationary; however, the light-field rotating device, which can comprise a dove prism and associated lenses, is rotated whereby the light field which falls upon these three light cells is rotated. Thus, the light cells are enabled to scan every area of the field and the areas outside of the central area are ring-shaped.

The photocell 20, which covers the center of the light field, will generate signals in response to light variations which have the lowest frequency components, since this region of the light field is rotated at the slowest speed. The photocells 22 and 24 will provide higher frequency component signals, since they are further from the center of the light field and the region being inspected by them is rotating at a greater speed. The photocell 20 is connected between the base of a transistor 40 and a common photocell return point, which is established at some suitable potential level by being connected to the junction of two resistors 42, 44. These two resistors are connected across the source of operating potential for the transistors, and thus a bias potential is provided at their junction for the photocells. A capacitor 46 is used for bypassing for alternating current the resistor 44. Photocell 22 is connected between the base of a transistor 48 and a common photocell return. Photocell 24 is connected between the base of the transistor 50 and the common cell return.

The transistor 40 has its emitter connected through resistor 52 to one side of a bias potentiometer 54. The slider arm of this bias potentiometer is connected to ground. The collector of transistor 40 is connected to the operating potential source through a load resistor 56. The amplified output of the transistor 40 is applied through a capacitor 60 to the base of a transistor 58. The capacitor 60 connects the collector of transistor 40 to the base of transistor 58. The base of transistor 58 is also connected to the junction of two series-connected resistors 62, 64, which are connected across the source of operating potential. The emitter of transistor 58 is connected to ground through a resistor 66, which is bypassed for alternating current by a capacitor 68. A collector load for transistor 58 is provided by a resistor 70 connected between the collector and the source of operating potential. Transistor 40 serves to amplify the output of the photocell 20, and transistor 58 serves to further amplify any alternating-current components of such output.

The emitter of transistor 48 is connected to ground through a resistor 72. This resistor is bypassed by a capacitor 74. A resistor 76 connects the collector of transistor 48 to the source of operating potential. The alternating-current output signals of transistor 48 are further amplified by a transistor 78. A capacitor 80 connects the collector of transistor 48 to the base of transistor 78. A bias potential is applied to the base of transistor 78 by reason of its being connected to the junction of two series-connected resistors 81, 82. These resistors are connected across the source of operating potential. The emitter of transistor 78 is connected to ground through a resistor 84, which is bypassed for alternating current by a parallel-connected capacitor 86. The collector of transistor 78 is connected to the source of operating potential through a resistor 88. Transistors 48 and 78, respectively, comprise a preamplifier and amplifier for any signals which are received from the photocell 22.

The output of the photocell 24 is applied to the base of the transistor 50. The emitter of transistor 50 is connected to ground through a resistor 90 which is bypassed for alternating-current components by the capacitor 92. The collector of transistor 50 is connected to the source of operating potential through a resistor 94. The output of transistor 50 is connected through a capacitor 96 to the base of transistor 98. The base of this transistor has a bias potential applied to it by reason of its being connected to the junction of two resistors 100, 102. These two resistors are connected across the source of operating potential. The emitter of transistor 98 is connected to ground through a resistor 104 which is bypassed for alternating current by a parallel-connected capacitor 106. The collector of transistor 98 is connected to the source of operating potential through a resistor 108. The transistors 50 and 98, respectively, serve as preamplifier and amplifier for any alternating-current signals received from the photocell 24.

Direct-current and low-frequency signal components which are generated by the photocell 20 are applied through a resistor 110 from the collector of transistor 40 to a diode 112. The higher-frequency-signal components generated by photocell 20 are applied from the collector of transistor 58 to a capacitor 114. The other side of this capacitor is connected to a junction 116, which is connected to the respective cathode and anode of two diodes 118, 120 and a resistor 122. The resistor 122 is connected in series with a potentiometer 124.

The amplified outputs from the photocell 22 are applied to a capacitor 126. The other side of this capacitor is connected to a junction 128. This junction is connected to the respective cathode and anode of two diodes 130, 132 and to a resistor 134. A potentiometer 136 is connected in series with the resistor 134.

The amplified output of signals of the photocell 24 are taken from the collector of transistor 98 and applied to a capacitor 138. The other side of this capacitor is connected to a junction 140. This junction is connected to the respective cathode and anode of two diodes 142, 144, as well as to a resistor 146. The resistor 146 is connected in series with the potentiometer 148.

The other sides of these potentiometers 124, 136, 148 are connected together and to the slidable arm of the potentiometer 150. This potentiometer is in series with another potentiometer 152. These potentiometers 150 and 152 are connected across the output of the power supply 154. The potentiometer 150 is used to adjust the sensitivity of the response of the circuits to the video signals.

The diodes 118, 130, and 142, which have their cathodes connected to the respective junctions 116, 128, and 140, have their anodes joined together and connected to the emitter of a transistor 154. The diodes 112, 120, 132, and 144 have their cathodes connected together and to the base of the transistor 154. The emitter of transistor 154 has a bias applied thereto by reason of its being connected to the junction of two resistors, respectively, 156, 158, which are connected across the source of operating potential.

It should be noted that the value of the operating potential is determined by the setting of the potentiometer 152. In conjunction with this, the value of the resistors 156 and 158 and the respective resistors 122, 134, 136, and the settings of the potentiometers 124, 136, 148 are such that the respective diodes 118, 130, and 142 are biased in a forward or current-conduction direction. As a result, any noise signals which arise cannot pass through the capacitors.

Each one of the circuits including the respective capacitors 114, 126, and 138 and the associated diodes which are conductive effectively comprises a discriminating network which responds to the rate of change of the signals occurring at the respective collectors of the amplifiers 58, 78, and 98. Changes in light level due to variations in glass thickness, glass color, or lettering on the glass are slow-varying changes, whereas changes in light level due to the presence of dirt particles are abrupt. Slowly varying signals will not pass through the capacitors but abrupt signal variations will. These abrupt signal variations must also be large, so that after amplification a signal is produced having a level sufficient to block the conduction of any one of the diodes 118, 130, and 142 and to pass through diodes 120, 132, and 144. Any signals arising in the region at the center of the light field which have components of a sufficiently low frequency not to pass through the capacitor 60 are passed through the diode 112 to the base of transistor 154. The base of this transistor is connected to ground through a resistor 160.

From the description which has preceded, it can be concluded that photocells 20, 22, 24, either individually or collectively, will generate signals in response to variations in light levels in the light field representing illumination, which is passed through a bottle under inspection. These signals are amplified and pass through a network which provides an output only when the change in amplitude as well as the rate of change of these signals exceeds predetermined values which are established by the bias voltages used, as well as the values of circuit components. Thereby, those signals, due to conditions other than dirt, will not pass through this network. Low-frequency signal components arising in the central region of the light field are applied to the base of a transistor 154, as are also signals which can pass through the discriminating networks. In order to render this transistor 154 conductive, one or more of the applied signals must exceed the potential at the emitter of this transistor. As previously pointed out, this bias potential is established by the voltage divider of resistors 156 and 158. For the signals applied to this transistor base through the diodes 120, 132, 144, this requirement is satisfied when a signal can pass through these diodes.

The collector of transistor 154 is connected to a source of operating potential through two series resistors 162, 164. The base of the transistor 166 is connected to the junction of the two resistors 162, 164. The collector of transistor 166 is connected to ground through three series-connected resistors, respectively 168, 170, 172. The emitter of transistor 166 is connected to the source of operating potential.

A transistor 174 has its collector connected to the junction between resistors 168 and 170 and its emitter connected to ground. The emitter of transistor 174 is also connected back to its base through a resistor 176. The base of transistor 174 is connected through a diode 178 to a network including a resistor 180 and a capacitor 182, which has one side connected to a junction made with diode 178 and resistor 180 and the other side connected to one side of a resistor 184. The other ends of resistors 180 and 184 are connected together and to the source of operating potential. The junctions of resistor 184 and capacitor 182 are connected through a resistor 186 to a contact 188 of the switch 16. A swinger arm 190 of the switch 16 is connected to ground. The resistor 186 is bypassed for alternating current to ground through a parallel-connected capacitor 192.

A silicon-controlled rectifier 194 has its control electrode connected to the junction of resistors 170 and 172. Its cathode is connected to ground, and its anode is connected through a resistor 196 to a contact pair 198A of a reject relay 198. The contact pair 198A are connected in series with the winding of the relay 198, which is connected on its other side to the source of operating potential. A bypass capacitor 200 is connected between the contact pair 198A and ground. A second contact pair 198B for the relay 198, when operated, energizes the reject mechanism 202. Capacitor 204 is used for quickly turning on as well as off the silicon-controlled rectifier 194.

There has already been described herein how the transistor 154 may be rendered conductive in response to the detection by the preceding circuit of a signal representative of a dirt particle. This signal is amplified by the transistor 154, the output of which is further amplified by the transistor 166. However, until a bottle is properly established in the inspection zone, no further operation in response to signals generated by the photocells will occur in view of the fact that transistor 174 is biased to be conductive in saturation, and thereby effectively connects to ground the junction between the resistors 168 and 170. The bias of transistor 174 occurs by reason of the potential divider established by a resistor 180, diode 178, and resistor 176, which are connected in series across the source of operating potential.

When a bottle is properly positioned in the inspection zone, the switch mechanism 16 effectuates a closure of the switch contacts 188 and 190, whereby the junction between capacitor 182 and resistor 184 is connected to ground. This will cause capacitor 182 to commence to charge through resistor 180, whereby the potential at the junction 181 of diode 178, resistor 180, and capacitor 182 drops sufficiently low, so that transistor 174 is no longer conductive in saturation. Accordingly, any signal which is being received by transistor 166 at its base is established across the resistance divider 168, 170, 172 connected to its collector. This signal will fire the silicon-controlled rectifier 194. As a result, relay 198 is energized over its contacts 198A. The relay will close, closing thereby the contacts 198A and 198B, and causing the reject mechanism 202 to operate. As soon as the contacts 198A are closed by reason of the operation of the relay 198, the potential required to maintain the silicon-controlled rectifier 198 operative is removed. Accordingly, the silicon-controlled rectifier will cease conduction, and relay 198 is then rendered operative. The presence of capacitor 200 across the relay coil insures that the relay remains operative long enough for the reject apparatus to be operated. Thereafter, the entire circuit is ready for another inspection cycle.

By reason of the fact that the circuit comprising the embodiment of the invention operates responsive to the rate of signal change, rather than to mere differences in light level, the signals detected by the photocells can receive considerably more amplification than was possible heretofore without false triggering of the reject mechanism. As a result of being able to use more amplification without false triggering, this circuit arrangement enables the detection of smaller dirt particles than was possible heretofore. Those factors which limited the capabilities of systems in the prior art, such as bottle imperfections, bottle lettering, color differences, etc., do not affect the present system.

There has accordingly been shown and described herein a novel and unique circuit arrangement for detecting dirt in empty bottles. In order to exemplify an operative embodiment of the invention, there is shown in the drawing the values of the various components which were employed in said operative embodiment. It is to be understood that these values are shown by way of exemplification and are not to be construed as a limitation upon the invention. Similarly, the types of transistors which are shown were employed in an embodiment of this invention which has been built. Those well skilled in the art will know how to substitute NPN–type transistors for PNP–type transistors, and vice versa. Accordingly, the arrangement and types of transistors shown are to be considered as exemplary only, and not as limiting. Further, although a plurality of photodiodes are shown for inspecting an empty bottle for cleanliness, this, too, is by way of exemplification. One or more photodiodes may be employed with a circuit in accordance with this invention, without departing from the spirit or scope thereof.

I claim:

1. An improved circuit for a system for inspecting an empty bottle for cleanliness of the type wherein a bottle passes through an inspection zone including a source of illumination on one side and photocell means on the other side, said photocell means producing an output signal representative of the illumination reaching said photocell means, said circuit comprising a capacitor, a first diode, a second diode, means connecting said first and second diode to afford a unilateral current flow through both in series, means connecting one side of said capacitor between said first and second diodes, means for establishing a direct-current flow through said first diode, a bottle-reject relay means connected to said second diode, means for applying output signals from said photocell means to the other side of said capacitor, whereby only abrupt changes in said output signal of said photocell means having a sufficient amplitude to block conduction in said first diode can pass through said second diode to actuate said bottle reject relay means.

2. An improved circuit for a system for inspecting an empty bottle for cleanliness of the type wherein a bottle passes through an inspection zone including a source of illumination on one side and a plurality of photocells on the other side, each of said plurality of photocells producing an output signal representative of the level of illumination received, a first of said photocells being positioned to receive illumination which changes slowly relative to the changes in illumination received by a second of the photocells due to its position, said circuit comprising an inoperative bottle-reject relay means, means for rendering said inoperative bottle-reject relay means operative responsive to an input signal exceeding a predetermined level being applied thereto, a diode, means for directly applying the output signal of said first photocell to said diode, means connecting said diode to said means for rendering said bottle-reject circuit operative, first and second circuit means for passing only signals which have a rate of change in amplitude beyond a predetermined amplitude, which change occurs at a rate in excess of a predetermined rate, means for applying the output signals from said first and second photocells to said first and second circuit means, and means for connecting the output of said first and second circuit means to said means for actuating said bottle-reject relay means whereby said means for rendering said bottle-reject circuit operative can respond to output from any one of said rectifier and said first and second circuit means to render operative said bottle-reject relay means.

3. The circuit recited in claim 2 wherein said first circuit means comprises a capacitor, a first diode, a second diode, means connecting said first and second diodes in series for unilateral current flow therethrough, means connecting one side of said capacitor to the junction of said first and second diode, a resistor having one end connected to said junction, means for applying the output signals of said first photocell to the other side of said capacitor, means connecting said second diode to said means for rendering said inoperative bottle-reject means operative, and means for applying a potential difference across said first diode and said resistor for causing current flow therethrough.

4. In a system for inspecting an empty bottle for cleanliness of the type wherein a bottle passes through an inspection zone including a source of illumination on one side and a plurality of photocells on the other, each of said plurality of photocells producing an output signal, a first of said plurality of photocells being positioned to receive the slowest illumination changes, and a second of said plurality of photocells being positioned to receive illumination changes which occur at a more rapid rate than those received by said first photocell, an improved detection circuit comprising first and second circuit means for passing signals applied thereto which have an amplitude change which exceeds a predetermined amplitude at a rate more rapid than a predetermined rate, means for applying the output signals of said second photocell to said second circuit means, means for applying only the alternating components of the output signals of said first photocell to said first circuit means, an inoperative relay means for indicating that a dirty bottle has been detected, means for rendering said inoperative relay means operative upon the application of a signal exceeding a predetermined level to the input thereof, a rectifier, means connecting said rectifier to the input of said means for rendering said inoperative means operative, means for applying output signals from said first photocell directly to said rectifier, and means for connecting the output of said first and second circuit means to the input of said means for rendering said inoperative relay means operative whereby said means for rendering said relay means for indicating a dirty bottle operative can operate responsive to output from any one of said rectifier and first and second circuit means.

5. A detection circuit as recited in claim 4 wherein each said first and second circuit means includes a capacitor connected to receive the output of one of said photocells, a first and second diode each having an anode and a cathode, the cathode of said first diode being connected to the anode of said second diode, said capacitor being connected to the cathode of said first diode, a connection between the cathode of said second diode and the input of said means for rendering operative said inoperative means, a resistor connected to the cathode of said first diode, and means for applying a potential difference across said first diode and said resistor to cause current flow therethrough.

6. A detection circuit as recited in claim 4 wherein said means for applying the output signals of said first photocell to said rectifier comprises a first transistor having a base, collector, and emitter electrode, means connecting said first transistor base to said first photocell, and a resistor connected between the collector of said first transistor and said rectifier; said means for applying the alternoting-frequency components of said first photocell-output signals only to said first circuit means includes a second transistor having base, emitter, and collector electrodes, a capacitor connected between the collector of said first transistor and the base of said second transistor and a connection between the collector of said second transistor and said first circuit means.

7. An improved circuit for a system of the type for inspecting an empty bottle for opaque or nearly opaque objects, wherein a bottle passes through an inspection zone including a source of constant illumination on one side and a photocell means on the other producing an output signal representative of the level of light received through the bottle, said circuit comprising circuit means for passing only those portions of the output signal of said photocell means above a predetermined amplitude which represents abrupt changes in the level of illumination received by said photocell means caused by the presence of an opaque or nearly opaque object, inoperative relay means for rejecting a bottle containing the object, and means for actuating said inoperative relay means for rejecting a bottle responsive to an output from said photocell means above the predetermined amplitude.

8. In a system of the type for inspecting an empty bottle for opaque or substantially opaque objects, wherein a bottle passes through an inspection zone including a source of illumination on one side and a photocell disposed on the other side to produce an output signal representative of the illumination reaching it, said output signal having relatively high and low frequency components; an improved detection circuit comprising an inoperative relay means for indicating a bottle with an opaque or substantially opaque object therein, means for rendering said inoperative relay means operative upon the application of a signal exceeding a predetermined amplitude to the input thereof, circuit means for passing only signals exceeding said predetermined amplitude change at a rate exceeding a predetermined rate, means connecting the output of said circuit means to said input of said means for rendering said inoperative relay means operative, and means for applying to said circuit means only the said high frequency components of said output signals.

9. In the system set forth in claim 8, rectifier means which permits the entire photocell signal which exceeds a predetermined amplitude to render said inoperative relay means operative without interfering with the operation of said circuit means.

References Cited in the file of this patent
UNITED STATES PATENTS

| | | |
|---|---|---|
| 2,798,605 | Richards | July 9, 1957 |
| 2,945,588 | Fenn | July 19, 1960 |
| 2,947,877 | Stoate | Aug. 2, 1960 |
| 2,982,860 | Nehrbas | May 2, 1961 |
| 3,048,269 | Murley | Aug. 7, 1962 |
| 3,061,731 | Their et al. | Oct. 30, 1962 |